(12) United States Patent
Lee et al.

(10) Patent No.: US 8,347,732 B2
(45) Date of Patent: Jan. 8, 2013

(54) ADJUSTABLE ULTRASONIC GAS FLOW MEASUREMENT DEVICE

(75) Inventors: Chao-Fa Lee, Taipei (TW); Shu-Ting Liao, Taipei (TW); Cheng-Hsing Kup, Taipei (TW)

(73) Assignee: Tatung Company, Taipei (TW)

( * ) Notice: Subject to any disclaimer, the term of this patent is extended or adjusted under 35 U.S.C. 154(b) by 170 days.

(21) Appl. No.: 13/064,397

(22) Filed: Mar. 23, 2011

(65) Prior Publication Data

US 2012/0186362 A1 Jul. 26, 2012

(30) Foreign Application Priority Data

Jan. 21, 2011 (TW) .............................. 100102336 A

(51) Int. Cl.
*G01F 1/66* (2006.01)
(52) U.S. Cl. .................................................... 73/861.27
(58) Field of Classification Search ............... 73/861.27, 73/861.28; 702/48
See application file for complete search history.

(56) References Cited

U.S. PATENT DOCUMENTS

| 7,698,948 | B2 * | 4/2010 | Asafusa et al. ................. 73/627 |
| 7,824,336 | B2 * | 11/2010 | Kawabata et al. ............ 600/439 |
| 2012/0041693 | A1 * | 2/2012 | Liao et al. ....................... 702/48 |

* cited by examiner

*Primary Examiner* — Jewel V Thompson
(74) *Attorney, Agent, or Firm* — Bacon & Thomas, PLLC

(57) ABSTRACT

An adjustable ultrasonic gas flow measurement device includes a gas pipe, a transmitter, a receiver and a micro-processing module. The gas pipe is filled with a gas under test. The transmitter and the receiver are respectively installed in two ends of the gas pipe for transmitting and receiving ultrasonic signals inside the gas pipe. The micro-processing module is electrically connected to the transmitter and the receiver for generating and sending a first ultrasonic signal to the transmitter for transmitting, and comparing the phase shift of a second ultrasonic signal and a third ultrasonic signal to output a phase comparison result, wherein the transmitted first ultrasonic signal passing through the gas pipe was received by the receiver as the second ultrasonic signal, and the third ultrasonic signal is generated by shifting the first ultrasonic signal with a predetermined phase difference.

9 Claims, 6 Drawing Sheets

ADJUSTABLE ULTRASONIC GAS FLOW MEASUREMENT DEVICE

BACKGROUND OF THE INVENTION

1. Field of the Invention

The present invention relates to a measurement device and, more particularly, to an adjustable ultrasonic gas flow measurement device capable of adjusting the measuring range flexibly for the gas under test.

2. Description of Related Art

In the conventional gas measurement technology, an ultrasonic measurement device is used to perform measurement on a gas; the concentration, the flow and the molecular weight of the gas can be calculated from the phase shift difference of the ultrasonic signals passing through the gas. A conventional phase detection circuit is used to perform phase comparison for ultrasonic signals, and the obtained phase shift difference is used as an actual phase shift difference to perform subsequent calculations. Please refer to FIG. 1, which is a schematic diagram of a conventional ultrasonic measurement device. As shown, the ultrasonic measurement device includes a gas pipe 10, a transmitter 11, a receiver 12 and a micro-processing module 13. The gas pipe 10 has an inlet 101 and an outlet 102, which are respectively provided for gas to flow into and flow out the gas pipe 10. The transmitter 11 and the receiver 12 are located at two sides of the gas pipe 10 respectively. The micro-processing module 13 includes a clock generator 131 and a phase detection circuit 132. When a user wants to measure a gas, the gas pipe 10 is first filled with the gas to be measured. The clock generator 131 drives the transmitter 11 to transmit an ultrasonic signal into the gas pipe from one end of the gas pipe 10, and sends the ultrasonic signal to the phase detection circuit 132 simultaneously. The receiver 12 sends the ultrasonic signal received in the other end of the gas pipe 10 to the phase detection circuit 132. The phase detection circuit 132 compares the phase shifts of the transmitted ultrasonic and the received ultrasonic signals, and outputs a phase comparison result.

However, since the phase shift difference obtained from comparison is used as the actual phase shift difference in the above-mentioned measurement, an error may occur if the actual phase shift difference is greater than one phase. Please refer to FIG. 2, which is a schematic diagram of ultrasonic phase comparison of a conventional ultrasonic measurement device, wherein waveform denoted by (A) is the ultrasonic signal transmitted in the gas pipe, and waveforms denoted by (B1) and (B2) are the ultrasonic signals received from the pipe under two different measurement conditions. As shown in FIG. 2, a phase shift difference t1 can be obtained by comparing (A) and (B1), a phase shift difference t2 can be obtained by comparing (A) and (B2), but the actual phase shift difference of (B2) is t2, so that error may occur.

Therefore, when measuring a gas by using a conventional ultrasonic measurement device, the phase shift difference of ultrasonic signals passing through the gas should be smaller than one phase. However, the phase shift difference of ultrasonic signals changes with the molecular weight, temperature or the concentration of the gas under test. That is, the phase shift difference of ultrasonic signals passing through the gas under test is getting greater if the concentration of the gas is getting higher. When the phase shift difference of ultrasonic signals exceeds one phase, the measurement range of the conventional ultrasonic measurement device is exceeded. For example, the concentration of a gas under test increases, the flight time of sound will grow up, and the phase shift difference of ultrasonic signals may also increase with time, resulting in that, if using the conventional ultrasonic measurement device to measure the gas, error may occur when the phase shift difference reaches one phase. The same phenomenon was examined from flow measurement.

In the prior art, if it is desired to enlarge the measurement range of the ultrasonic measurement device, users may increase the size of the gas pipe or change the measurement resolution, which are inconvenient for users. Therefore, it is desirable to provide an ultrasonic measurement device to mitigate and/or obviate the aforementioned problems.

SUMMARY OF THE INVENTION

The object of the present invention is to provide an adjustable ultrasonic gas flow measurement device, which can enlarge the measurement range by adjusting the phase shift difference of the ultrasonic signal for comparison.

To achieve the object, there is provided an adjustable ultrasonic gas flow measurement device for measuring a gas, which includes: a gas pipe filled with the gas; a transmitter installed in an end of the gas pipe for transmitting a first ultrasonic signal inside the gas pipe; a receiver installed in the other end of the gas pipe for receiving a second ultrasonic signal, which is the first ultrasonic signal passing through the gas pipe; and a micro-processing module electrically connected to the transmitter and the receiver for generating and sending the first ultrasonic signal to the transmitter, and comparing the phase of the second ultrasonic signal received by the receiver and the phase of a third ultrasonic signal to output a phase comparison result, wherein the third ultrasonic signal is the first ultrasonic signal shifted with a predetermined phase shift difference.

In an embodiment, the adjustable ultrasonic gas flow measurement device further includes a thermal sensor, which is installed inside the gas pipe and electrically connected to the micro-processing module for sensing the temperature inside the gas pipe and sending the sensing result to the micro-processing module for adjusting the predetermined phase shift difference, which is preferably smaller than one phase of the predetermined phase shift.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
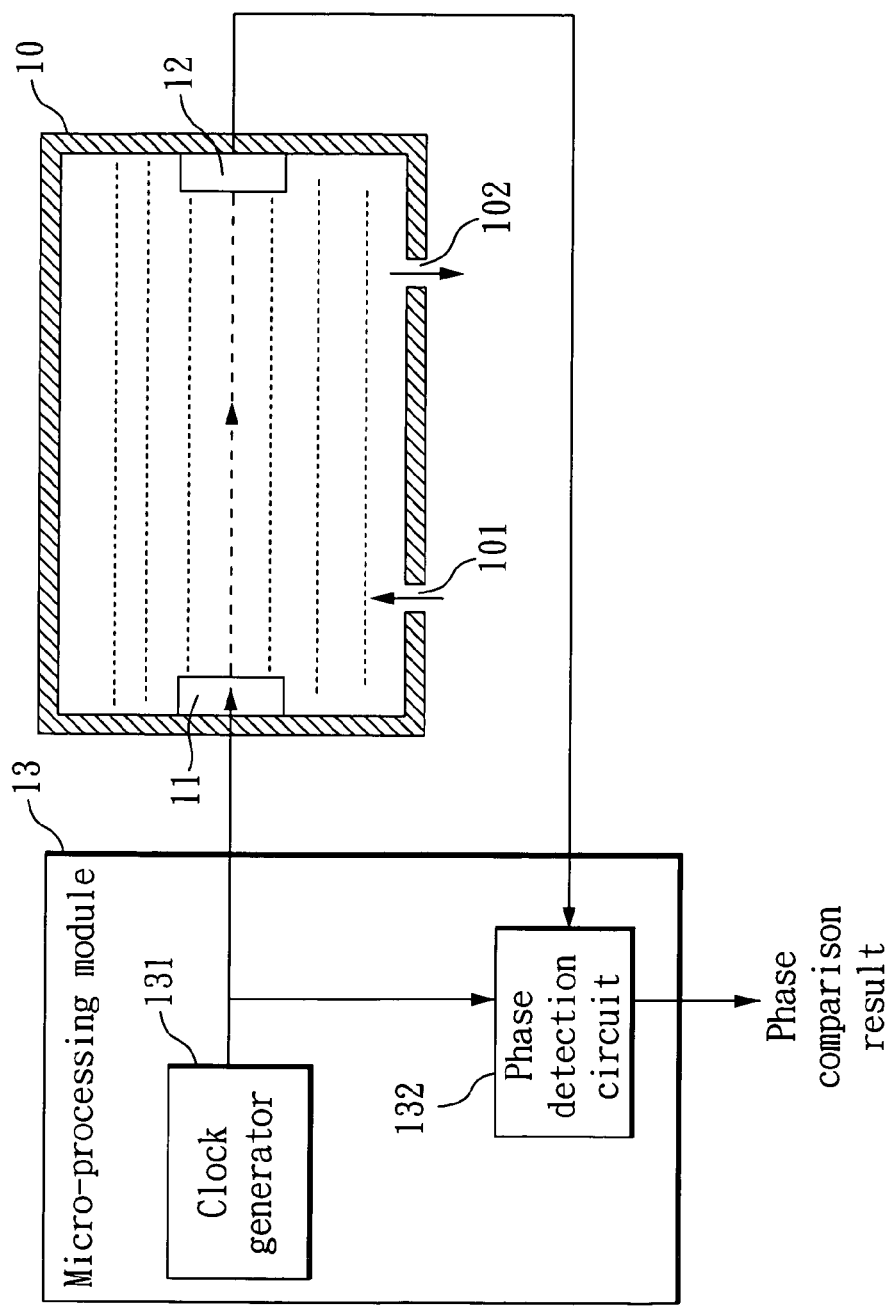
FIG. 1 is a schematic diagram of a conventional ultrasonic measurement device.
Figure 2:
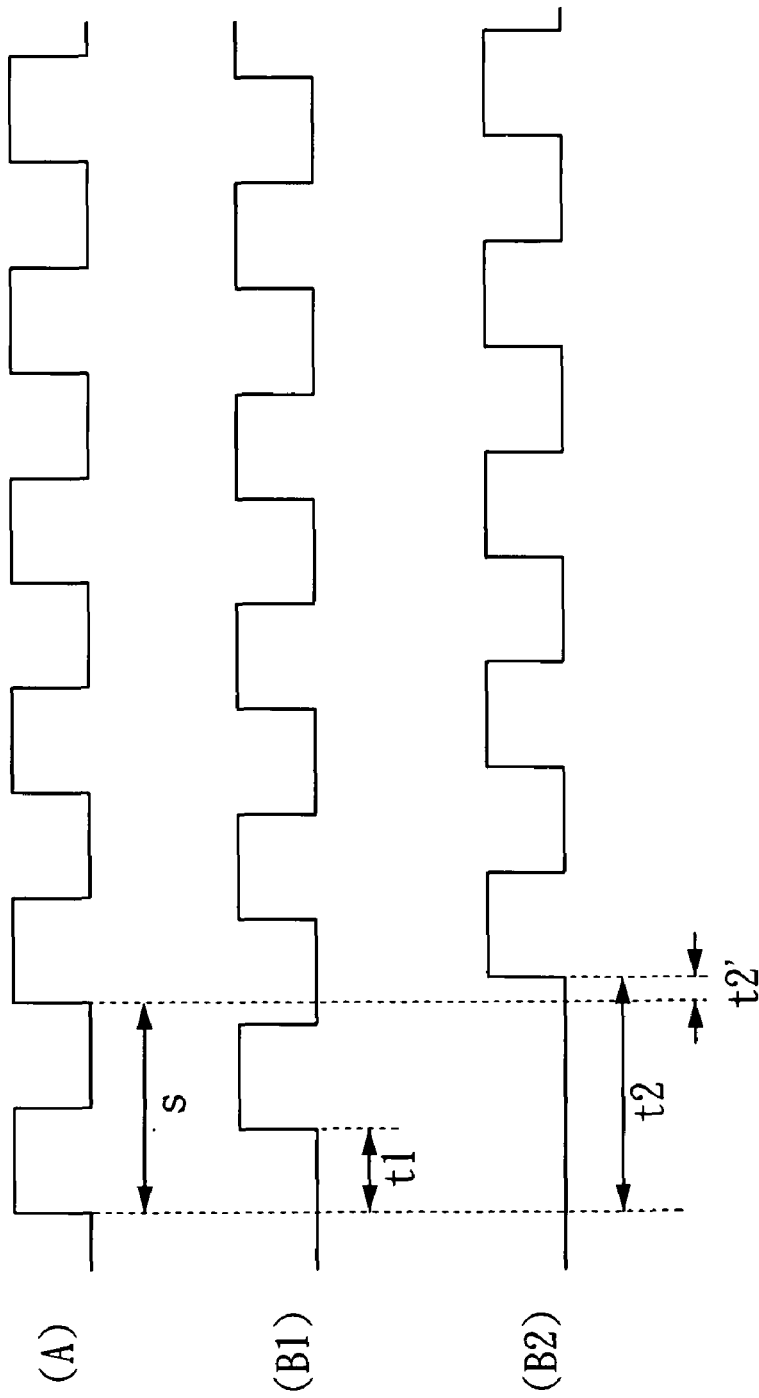
FIG. 2 is a schematic diagram of ultrasonic phase comparison of a conventional ultrasonic measurement device.
Figure 3:
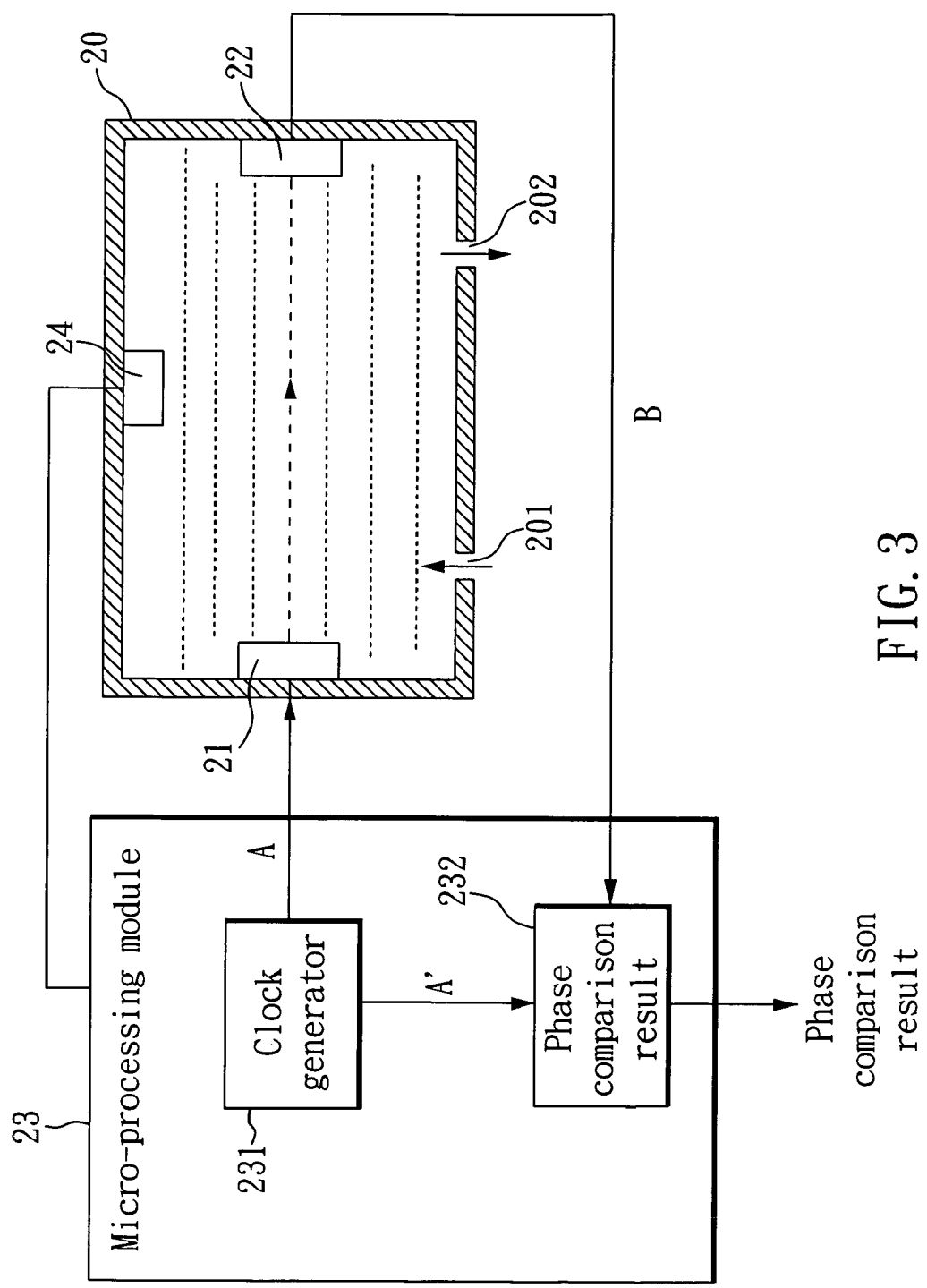
FIG. 3 is a schematic diagram of the adjustable ultrasonic gas flow measurement device according to the present invention.

With reference to FIG. 3, there is shown a schematic diagram of the adjustable ultrasonic gas flow measurement device according to the present invention. As shown in FIG. 3, the adjustable ultrasonic gas flow measurement device includes a gas pipe 20, a transmitter 21, a receiver 22, a micro-processing module 23 and a thermal sensor 24. The gas pipe 20 is filled with the gas and has an inlet 201 and an outlet 202, which are provided for the gas to flow in and out the gas pipe 20. The transmitter 21 is installed in one end of the gas pipe 20 and used for transmitting a first ultrasonic signal A. The receiver 22 is installed in the other end of the gas pipe 20 and used for receiving a second ultrasonic signal B, which is the first ultrasonic signal A transmitted by the transmitter 21 passing through the gas pipe 20 and received by the receiver 22. The micro-processing module 23 is electrically connected to the transmitter 21, the receiver 22 and the thermal sensor 24, and includes a clock generator 231 and a phase detection circuit 232. The clock generator 231 is used for generating the first ultrasonic signal A and a third ultrasonic signal A', and respectively sending the first ultrasonic signal A and the third ultrasonic signal A' to the transmitter 21 and the phase detection circuit 232. The phase detection circuit 232 is used for comparing the received second ultrasonic signal B and the third ultrasonic signal A' and outputting a phase comparison result, wherein the third ultrasonic signal A' is the first ultrasonic signal A shifted with a predetermined phase shift difference, which is smaller than one phase of the first ultrasonic signal A, and the micro-processing module 23 can adjust the predetermined phase shift difference according to the temperature, the concentration or the other measurement conditions of the gas under test. The thermal sensor 24 is installed inside the gas pipe 20 for sensing the temperature inside it and sending the sensing result to the micro-processing module 23 for adjusting the predetermined phase shift difference.

Figure 4:
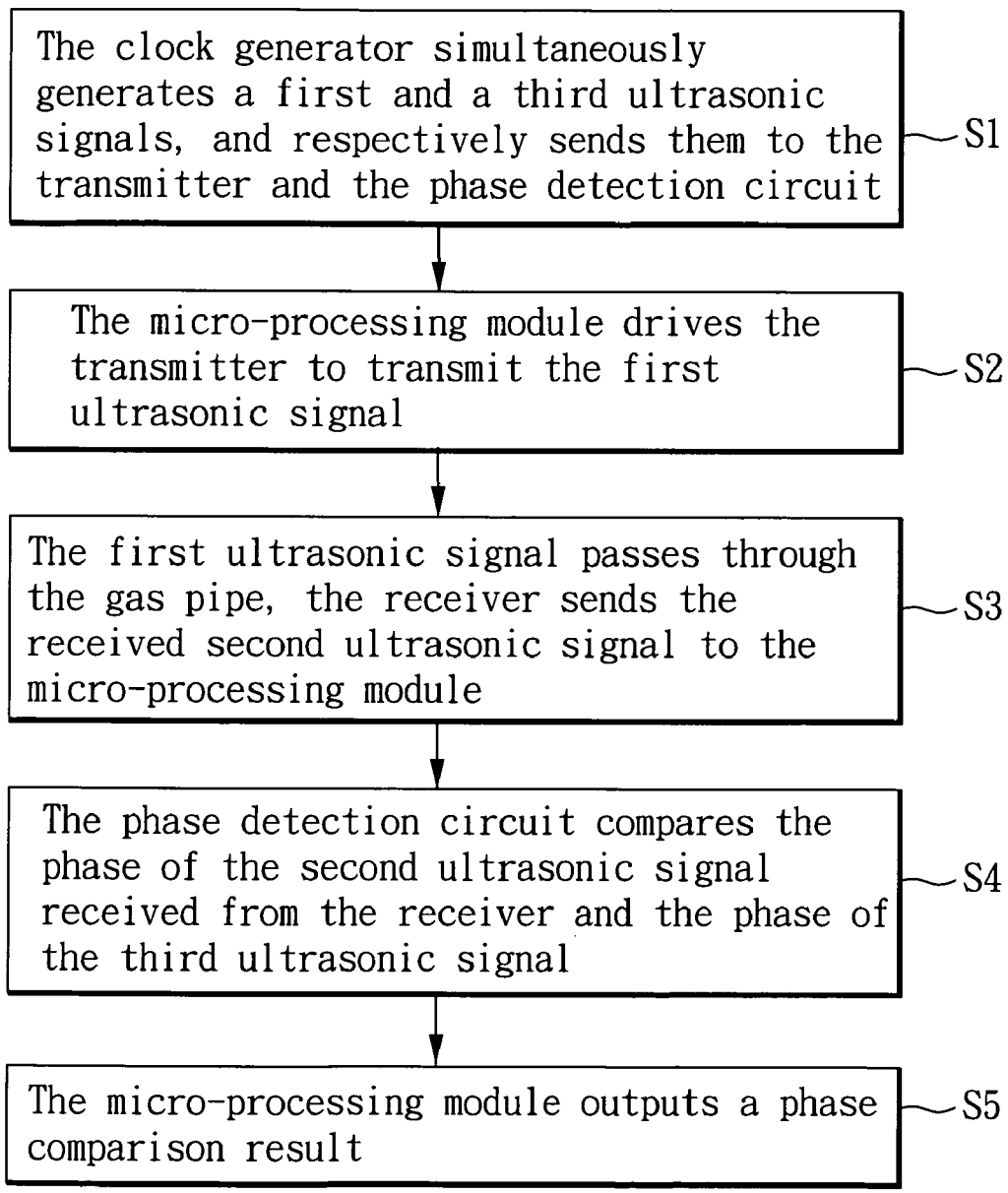
FIG. 4 is a measurement flowchart of the adjustable ultrasonic gas flow measurement device according to the present invention.

Please refer to FIG. 4, which is a measurement flowchart of the adjustable ultrasonic gas flow measurement device according to the present invention. When a user wants to measure a gas, first, the gas pipe 20 is filled with the gas under test. The thermal sensor 24 senses the temperature inside the gas pipe 20 and sends the measured temperature value to the micro-processing module 23. The clock generator 231 simultaneously generates a first ultrasonic signal A and a third ultrasonic signal A', and respectively sends them to the transmitter 21 and the phase detection circuit 232 (step S1), wherein the third ultrasonic signal A' is produced by delaying the first ultrasonic signal A with a predetermined phase shift difference, and the frequency of the first ultrasonic signal A and the third ultrasonic signal A' is preferably 40 KHz. The micro-processing module 23 drives the transmitter 21 to transmit the first ultrasonic signal A (step S2). The first ultrasonic signal A passes through the gas pipe 20, and the receiver 22 receives a second ultrasonic signal B and sends it to the micro-processing module 23 (step S3), wherein the second ultrasonic signal B is the first ultrasonic signal A transmitted by the transmitter 21, passing through the gas pipe 20 and received by the receiver 22. The micro-processing module 23 receives the second ultrasonic signal B from the receiver 22. The phase detection circuit 232 compares the phase of the second ultrasonic signal B and the phase of the third ultrasonic signal A' (step S4). The micro-processing module 23 outputs a phase comparison result (step S5). The micro-processing module 23 may further calculate the concentration, the flow or the molecular weight of the gas from the phase comparison result.

Figure 5:
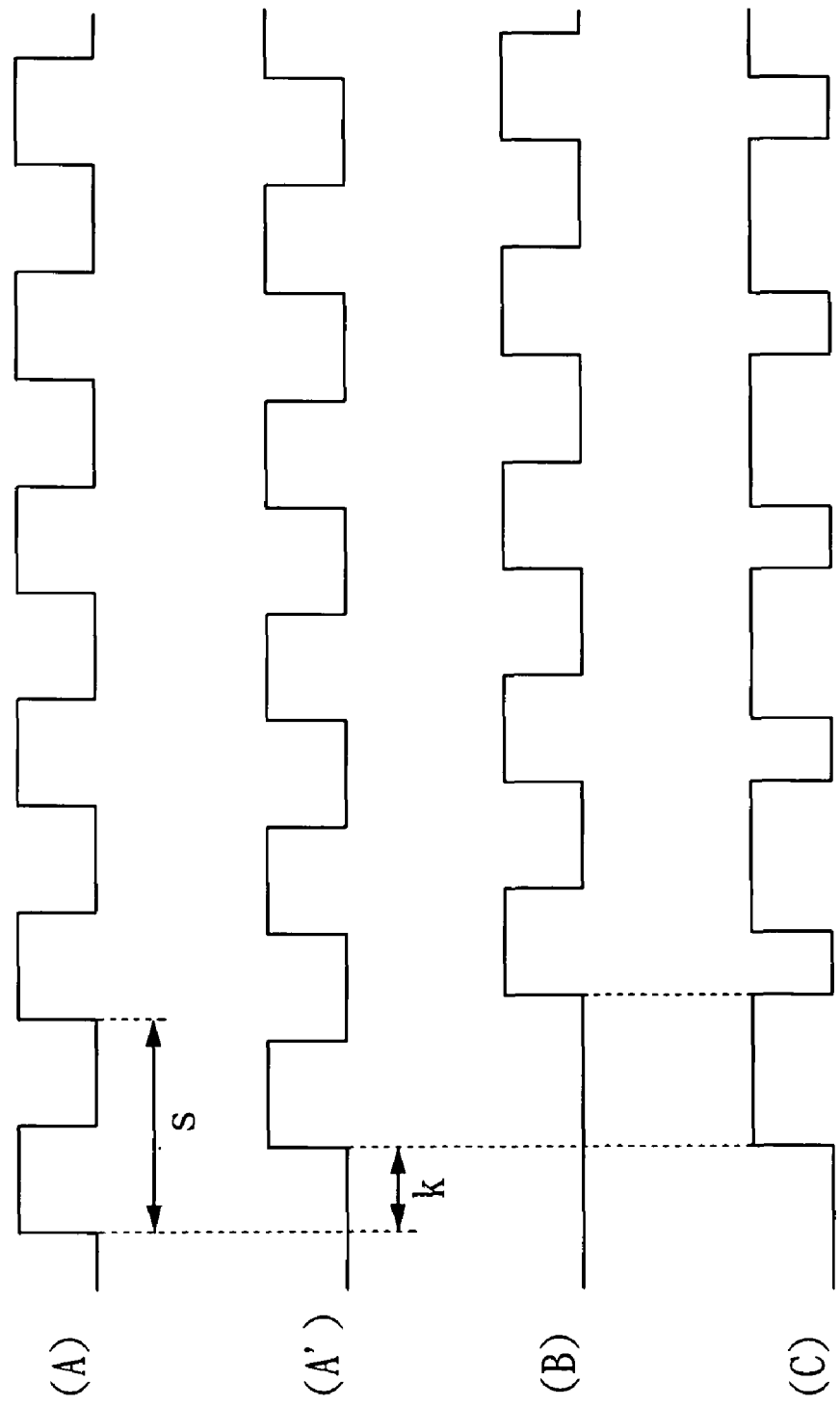
FIG. 5 is a schematic diagram of ultrasonic phase comparison of the adjustable ultrasonic gas flow measurement device according to the present invention.

With reference to FIG. 5, there is shown a schematic diagram of ultrasonic phase comparison of the adjustable ultrasonic gas flow measurement device according to the present invention. In FIG. 5, waveform denoted by (A) is the first ultrasonic signal generated by the clock generator 231, waveform denoted by (A') is the third ultrasonic signal generated by the clock generator 231, waveform denoted by (B) is the second ultrasonic signal received by the receiver 22, waveform denoted by (C) is the phase comparison result signal outputted by the phase detection circuit 232. The second ultrasonic signal B is the first ultrasonic signal A transmitted by the transmitter 21 passing through the gas pipe 20 and received by the receiver 22, and the third ultrasonic signal A' is generated by delaying the first ultrasonic signal A with a predetermined phase shift difference k, which is smaller than one phase s of the first ultrasonic signal A. The phase detection circuit 232 compares the phase of the second ultrasonic signal B received by the receiver 22 and the phase of the third ultrasonic signal A', generates the phase comparison result signal C and outputs it by the micro-processing module 23.

Figure 6A:
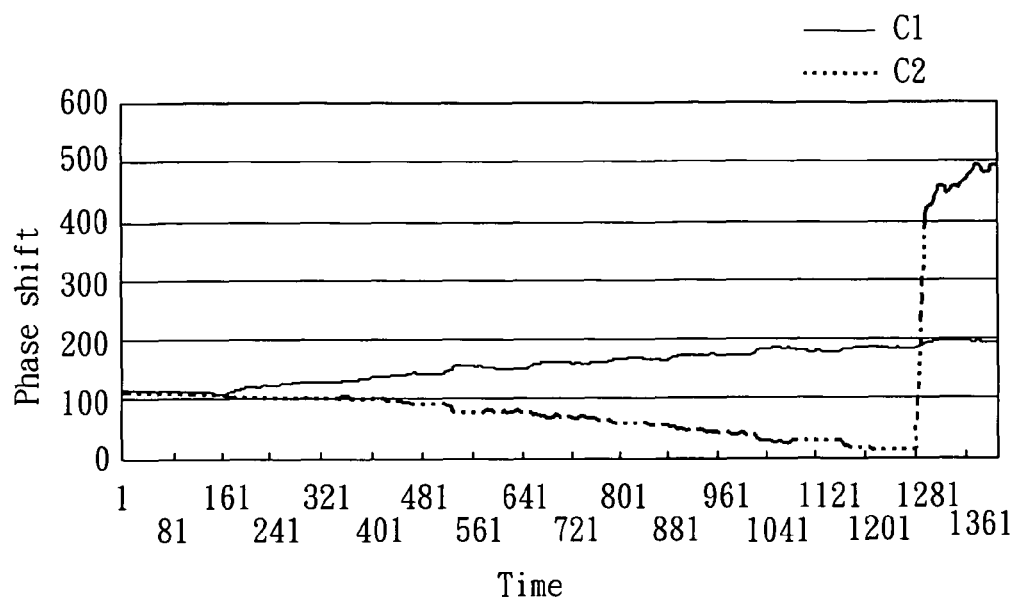
FIG. 6A is a schematic diagram of measurement result of the adjustable ultrasonic gas flow measurement device of the present invention with the third ultrasonic not shifted.
Figure 6B:
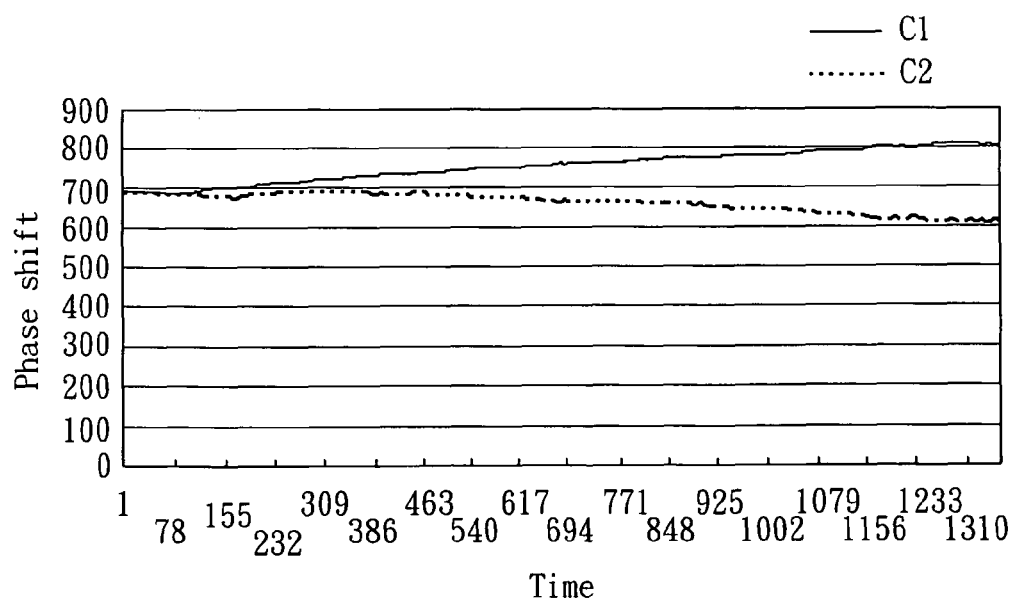
FIG. 6B is a schematic diagram of measurement result of the adjustable ultrasonic gas flow measurement device of the present invention with the third ultrasonic shifted.

Please refer to FIGS. 6A and 6B. FIG. 6A is a schematic diagram of measurement result of the adjustable ultrasonic gas flow measurement device of the present invention with the third ultrasonic not shifted, and FIG. 6B is a schematic diagram of measurement result of the adjustable ultrasonic gas flow measurement device of the present invention with the third ultrasonic shifted, which are obtained by actual measurement. The measurement results shown in FIGS. 6A and 6B are obtained by measuring the gas with the first measurement condition C1 and the second measurement condition C2 by setting the predetermined phase shift difference as 0 and 600 respectively, wherein the first measurement condition C1 and the second measurement condition C2 changes with time. In FIG. 6A, under the second measurement condition C2, the phase shift difference instantly increases 400 at the time 1281 (142 seconds), it means that the measurement range with setting the predetermined phase shift difference as 0 has already been exceeded in this moment. Further, it can be known from FIG. 6B that setting the predetermined phase shift difference as 600 may measure the gas under the second measurement condition C2 in the measurement range.

In view of the foregoing, it is known that the adjustable ultrasonic gas flow measurement device of the present invention is able to effectively enlarge the measurement range by delaying the third ultrasonic signal with a predetermined phase shift difference. Also, the measurement range of the present invention is flexible and adjustable, so that users can adjust the predetermined phase shift difference according to the temperature, the concentration or other test conditions, to thereby perform the measurement in an appropriate measurement range. In addition, for adjusting the measurement range of the adjustable ultrasonic gas flow measurement device of the present invention, there is no need to change the hardware, the operation commands are not complicated, no parameters have to be tuned, and the resolution of the measurement result does not need to be changed. Therefore, the measurement is easy to perform, and the execution of the subsequent calculation or application is also convenient.

Although the present invention has been explained in relation to its preferred embodiment, it is to be understood that many other possible modifications and variations can be made without departing from the scope of the invention as hereinafter claimed.

What is claimed is:

1. An adjustable ultrasonic gas flow measurement device for measuring a gas, comprising:

a gas pipe filled with the gas;

a transmitter installed in an end of the gas pipe for transmitting a first ultrasonic signal inside the gas pipe;

a receiver installed in the other end of the gas pipe for receiving a second ultrasonic signal, which is the first ultrasonic signal passing through the gas pipe; and a micro-processing module electrically connected to the transmitter and the receiver for generating and sending the first ultrasonic signal to the transmitter, and comparing a phase of the second ultrasonic signal received by the receiver and a phase of a third ultrasonic signal to output a phase comparison result, wherein the third ultrasonic signal is the first ultrasonic signal shifted a predetermined phase shift difference.

2. The adjustable ultrasonic gas flow measurement device as claimed in claim 1, wherein the micro-processing module includes a clock generator and a phase detection circuit, the clock generator is used for generating the first ultrasonic signal and the third ultrasonic signal, the phase detection circuit is used for comparing the received second ultrasonic signal and the third ultrasonic signal to output the phase comparison result.

3. The adjustable ultrasonic gas flow measurement device as claimed in claim 2, wherein the clock generator simultaneously generates the first and the third ultrasonic signals, and respectively sends the first and the third ultrasonic signals to the transmitter and the phase detection circuit; the micro-processing module drives the transmitter to transmit the first ultrasonic signal; the first ultrasonic signal passes through the gas pipe, the receiver sends the received second ultrasonic signal to the micro-processing module, the micro-processing module receives the second ultrasonic signal from the receiver, the phase detection circuit compares the phase of the second ultrasonic signal and the phase of the third ultrasonic signal and outputs the phase comparison result.

4. The adjustable ultrasonic gas flow measurement device as claimed in claim 1, wherein the gas pipe has an inlet and an outlet, which are provided for the gas to flow in and out the gas pipe respectively.

5. The adjustable ultrasonic gas flow measurement device as claimed in claim 1, wherein the micro-processing module is further used for adjusting the predetermined phase shift difference.

6. The adjustable ultrasonic gas flow measurement device as claimed in claim 5, further comprising a thermal sensor installed inside the gas pipe and electrically connected to the micro-processing module for sensing the temperature inside the gas pipe and sending a sensing result to the micro-processing module for adjusting the predetermined phase shift difference.

7. The adjustable ultrasonic gas flow measurement device as claimed in claim 1, wherein the predetermined phase shift difference is smaller than one phase of the first ultrasonic signal.

8. The adjustable ultrasonic gas flow measurement device as claimed in claim 1, wherein the micro-processing module is further provided for calculating concentration, flow or molecular weight of the gas from the obtained phase comparison result.

9. The adjustable ultrasonic gas flow measurement device as claimed in claim 1, wherein the frequency of the first and the third ultrasonic signals is 40 KHz.

* * * * *